US009966823B2

(12) United States Patent
Bouarroudj et al.

(10) Patent No.: US 9,966,823 B2
(45) Date of Patent: May 8, 2018

(54) SYNCHRONOUS ELECTRIC MOTOR WITH PERMANENT MAGNETS

(71) Applicant: VALEO EQUIPEMENTS ELECTRIQUES MOTEUR, Creteil (FR)

(72) Inventors: Lilya Bouarroudj, Charenton le Pont (FR); Jean-Claude Matt, Dijon (FR)

(73) Assignee: Valeo Equipments Electriques Moteur, Creteil (FR)

( * ) Notice: Subject to any disclaimer, the term of this patent is extended or adjusted under 35 U.S.C. 154(b) by 227 days.

(21) Appl. No.: 14/894,742

(22) PCT Filed: Jun. 2, 2014

(86) PCT No.: PCT/FR2014/051297
§ 371 (c)(1),
(2) Date: Nov. 30, 2015

(87) PCT Pub. No.: WO2014/195615
PCT Pub. Date: Dec. 11, 2014

(65) Prior Publication Data

US 2016/0126818 A1 May 5, 2016

(30) Foreign Application Priority Data

Jun. 5, 2013 (FR) ..................................... 13 55145

(51) Int. Cl.
*H02K 21/12* (2006.01)
*H02K 21/16* (2006.01)
(Continued)

(52) U.S. Cl.
CPC ............... *H02K 21/12* (2013.01); *H02K 1/02* (2013.01); *H02K 1/2773* (2013.01); *H02K 21/16* (2013.01); *H02K 2213/03* (2013.01)

(58) Field of Classification Search
CPC ........ H02K 21/12; H02K 1/2773; H02K 1/02; H02K 2213/03
See application file for complete search history.

(56) References Cited

U.S. PATENT DOCUMENTS 5,693,995 A * 12/1997 Syverson ............. H02K 1/2773 310/114
8,405,271 B2 * 3/2013 Lee ........................ H02K 29/03 310/156.46

(Continued)

FOREIGN PATENT DOCUMENTS

WO WO2013060960 5/2013

OTHER PUBLICATIONS

Khanchoul et al, "Design and Study of a Permanent Magnet Synchronous Motor for an Electric Compressor", Progress in Electromagnetics Research Symposium Proceedings, Marrakesh, Morocco, Mar. 20-23, 2011, pp. 171-175.

*Primary Examiner* — Dang Le
(74) *Attorney, Agent, or Firm* — Berenato & White, LLC

(57) ABSTRACT

A synchronous electric motor with permanent magnets (1, 11). The synchronous electric motor includes a wound stator (11) having axially extending stator teeth (13) formed in a frame (10), and a rotor (1) having a plurality of permanent magnets (3) extending axially in first recesses (4) of a cylinder head (2). A dimensional ratio of a first outer diameter (D1) of the rotor (1) to a second outer diameter (D2) of the stator (11) is pre-determined so that the motor provides optimum efficiency. The dimensional ratio is pre-determined in such a way that the stator losses by Joule effect are reduced to a minimum. The synchronous electric motor is employed in electric compressors for motor vehicles.

18 Claims, 3 Drawing Sheets

2 3 1 N S 4 5 7 N 6 X-X' D1 D2 10 S 9 8 N 11 12 13 14

(51) Int. Cl.
*H02K 1/27* (2006.01)
*H02K 1/02* (2006.01)

(56) References Cited

U.S. PATENT DOCUMENTS

2012/0038237 A1* 2/2012 Li .......................... H02K 1/146
310/156.45
2013/0038162 A1 2/2013 Pan
2013/0038165 A1 2/2013 Pan

* cited by examiner

SYNCHRONOUS ELECTRIC MOTOR WITH PERMANENT MAGNETS

CROSS-REFERENCE TO RELATED APPLICATIONS AND CLAIM TO PRIORITY

This application is a national stage application of International Application No. PCT/FR2014/051297 filed Jun. 2, 2014, which claims priority to French Patent Application No. 1355145 filed Jun. 5, 2013, the disclosures of which are incorporated herein by reference and to which priority is claimed.

FIELD OF THE INVENTION

The present invention relates to a synchronous motor with permanent magnets for applications in the motor vehicle industry, in particular for an electric compressor.

BACKGROUND OF THE INVENTION

As a result of their increased performance in terms of output and specific power and power density, synchronous machines with permanent magnets now have an extensive application in the field of motor vehicles.

These electrical machines can be produced with a wide range of powers and speeds, and have applications both in vehicles of the "all-electric" type and in vehicles with low $CO_2$ emission of the type known as "mild hybrid" and "full hybrid".

Mild-hybrid applications generally concern electrical machines of approximately 8 to 15 kW, for example an electric motor which is fitted on the front face of a thermal engine, and is coupled to it by a drive belt. With an electric motor of this type, it is possible to reduce the capacity of the thermal motorisation (engine downsizing) by providing electric torque assistance which supplies additional power, in particular during restarting. In addition, fraction at low speed, for example in an urban environment, can also be ensured by this same electric motor.

Another example of application of electrical machines in this power range is the driving of a centrifugal compressor of a system for double supercharging of a thermal engine. At low speed the electric compressor assists the turbo-compressor which is driven by the exhaust gases, and makes it possible to dispense with an additional step in the reduction of the capacities.

Applications of the full-hybrid type generally concern motors of 30 to 50 kW, for architectures of a series and/or parallel type, with the level of integration which is more refined than that of the electric motor(s) in the traction chain of the vehicle.

However, the batteries of these electric vehicles are sensitive to climatic conditions, and the autonomy of the vehicle can be greatly reduced in the most stringent conditions. An air-conditioning system is therefore necessary.

In vehicles with a thermal engine, the compressor of the air-conditioning system is generally coupled mechanically to this engine.

In electric vehicles, the compressor is driven by an electric motor which must comply with numerous constraints, not only in terms of power, torque and speed of rotation, but also dimensions and weight.

A motor of this type is discussed in an article which was submitted in the conference "Progress in Electromagnetism Research Symposium" in 2011 in Marrakesh, Morocco, by M. Kanchoul et al ("*Design and study of a permanent magnet synchronous motor*", p. 160, PIERS, 20-23 Mar. 2011).

This concerns a synchronous motor with permanent magnets of the NdFeB type, with nominal power of 6 kW, maximum torque of 6 Nm, and a maximum speed of 10,000 rpm. The weight of the motor is less than 2 kg, and its length is less than 50 mm.

In these circumstances, in order to comply with ever-increasing energy constraints, the inventive body has determined a need for a motor with increased performance.

SUMMARY OF THE INVENTION

The purpose of the present invention is thus to optimise dimensional parameters of a motor of the aforementioned type in order to obtain the best possible performance.

Specifically, its objective is a synchronous electric motor with permanent magnets of the type comprising a wound stator comprising stator teeth which extend axially and are formed in a casing, and a rotor comprising a plurality of these permanent magnets which extend axially in first recesses in a head.

According to the invention, this synchronous electric motor with permanent magnets has a dimensional ratio of a first outer diameter of the rotor to a second outer diameter of the stator which is predetermined such that the said motor has maximum performance.

Advantageously, the said dimensional ratio is predetermined such that stator losses by Joule effect are minimum.

Preferably, this rotor is of the flux concentration type.

The synchronous electric motor according to the invention is thus distinguished in that the permanent magnets each comprise a first parallelepiped part, close to a circumferential part of the rotor, adjacent to a second part in the form of a wedge, close to a central part of this rotor.

The rotor of the motor according to the invention additionally advantageously comprises at least one plurality of second recesses which extend axially, and are arranged between the permanent magnets in an intermediate part of the rotor between the central part and the circumferential part.

Tie rods are preferably arranged in these second recesses.

Advantage will be derived from the fact that the permanent magnets of the motor according to the invention are constituted by ferrite.

The invention also relates to an electric compressor which is designed to equip a motor vehicle, distinguished in that it comprises a synchronous electric motor with permanent magnets with the above characteristics, and in general any equipment of a motor vehicle constituted by a motor of this type.

These few essential specifications will have made apparent to persons skilled in the art the advantages provided by the synchronous electric motor with permanent magnets according to the invention, as well as by the electric compressor which uses it, in comparison with the prior art.

The detailed specifications of the invention are provided in the description which follows, together with the appended drawings. It should be noted that these drawings simply serve the purpose of illustrating the text of the description, and do not constitute in any way a limitation of the scope of the invention.

DETAILED DESCRIPTION OF THE PREFERRED EMBODIMENT(S)

Figure 1:
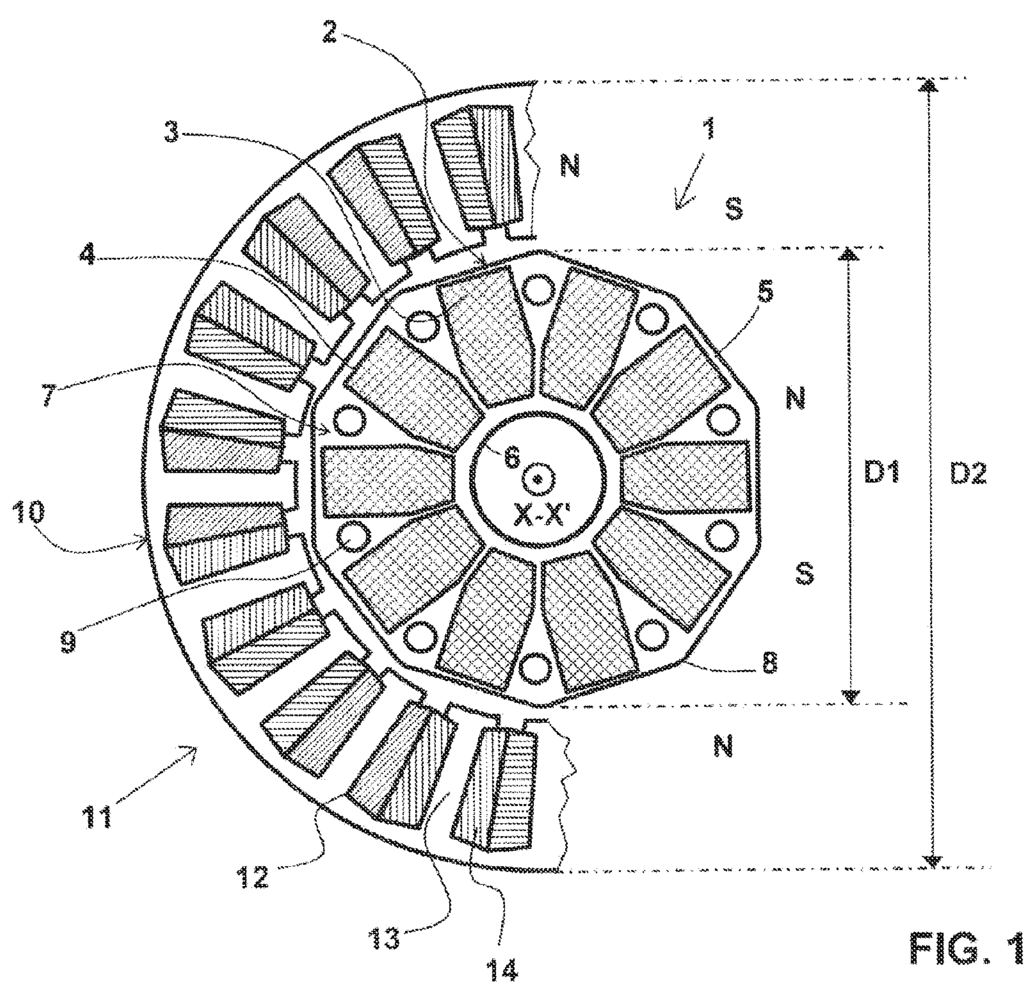
FIG. 1 shows a simplified view in radial cross section of a rotor with permanent magnets arranged in a stator, shown in partial radial cross-section, of a synchronous electric motor of a type corresponding to the main embodiment of the invention.

The simplified radial cross-section of a rotor 1 with permanent magnets corresponding to the main embodiment of the invention represented in FIG. 1 shows clearly the arrangement in a head 2 of the permanent magnets 3 in first recesses 4 which are distributed regularly between a circumferential part 5 and a central part 6, such as to form a plurality of alternating north N and south S poles.

The rotor 1 of the motor according to the invention is of the flux concentration type. The permanent magnets 3 have globally a substantially rectangular cross-section, but chamfered in the form of a wedge towards the axis X-X' of the rotor 1. They extend symmetrically in the vicinity of equi-angular axial planes.

The first recesses 4 in which the permanent magnets 3 are arranged delimit ten circumferential polar sections 7 in the particular example represented.

The assembly of these polar sections 7 forms in radial cross-section a substantially circular figure with a plurality of lobes 8 corresponding to the projection of the N, S poles.

The polar sections 7 comprise second recesses 9 which are arranged between the permanent magnets 3. They extend symmetrically in the vicinity of equi-angular axial planes.

These second recesses 9 have a circular cross-section, and receive tie rods which retain the sets of metal plates which form the head 2 of the rotor 1.

These second recesses 9 also contribute to controlling the magnetic field in the rotor 1.

In a particular embodiment of the motor according to the invention, the rotor 1, comprising ten permanent magnets 3 constituted by ferrite, rotates inside a casing 10 of a stator 11 with a plurality of notches 12 defining a plurality of stator teeth 13, around which stator windings 14 are arranged.

A specific embodiment is for example an 8 to 15 kW motor 1, 11 for applications in motor vehicles of the so-called mild-hybrid type.

This motor 1, 11 can be designed for starting of the thermal engine, torque assistance for the thermal engine, and electric traction at low speed of the vehicle, as well as for driving a centrifugal compressor.

The stator windings 14 have a stator current passing through them, and create a rotary magnetic field which drives the rotor 1. The motor torque provided depends in particular on the intensity of the stator current and the magnetic flux in the rotor 1.

A requirement for an increase in the performance of the motor 1, 11 in terms of motor torque mostly leads to a decrease in the output of the motor, because of the increase in stator losses by Joule effect $P_J$ in the stator windings 14 caused by the increase in the stator current.

The inventive body has discovered by means of computer simulations that it is possible to increase the output of the motor 1, 11 by means of a decrease in the stator losses by Joule effect $P_J$ by optimising a characteristic dimensional ratio r equal to that of a first outer diameter D1 of the rotor 1 to a second outer diameter D2 of the stator 11.

Figure 2:
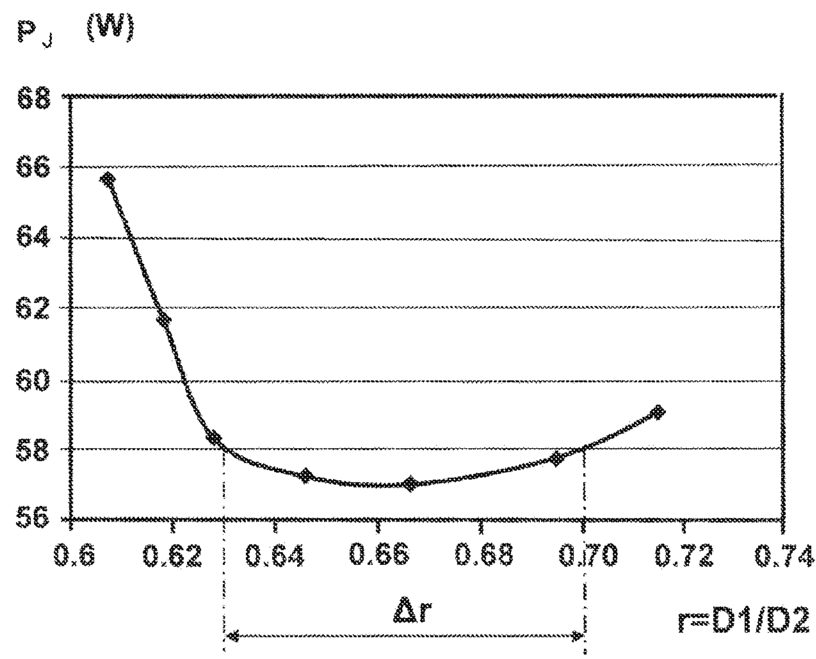
FIG. 2 shows the variation of the stator losses by Joule effect according to the dimensional ratio of rotor to stator of asynchronous electrical machine of a type corresponding to the main embodiment of the invention.

As shown clearly in FIG. 2, the stator losses by Joule effect $P_J$ expressed as a function of r=D1/D2, have a clear minimum for r contained in a range Δr going from 0.63 to 0.70.

Figure 3:
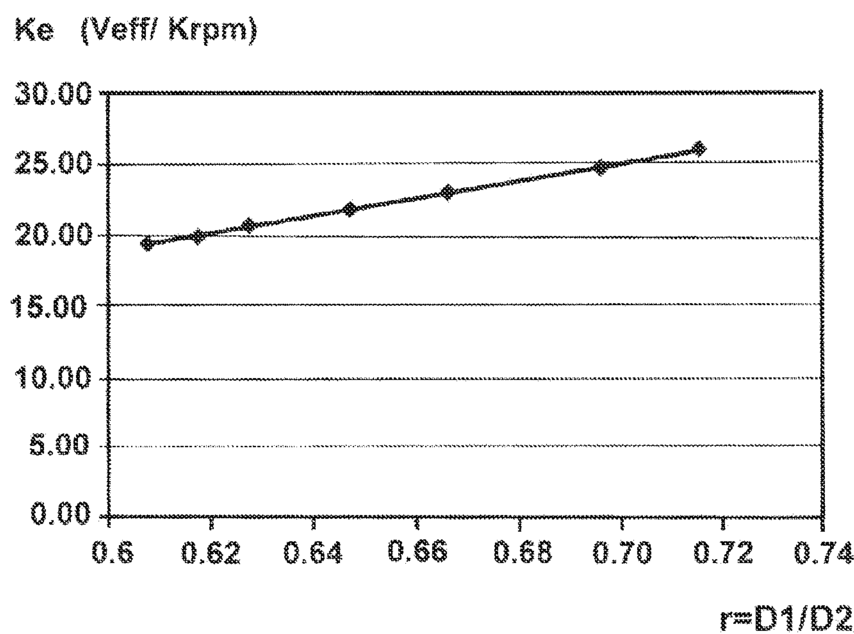
FIG. 3 shows the variation of the electromotive force constant of a synchronous electric motor of a type corresponding to the main embodiment of the invention, according to the dimensional ratio of rotor to stator.
Figure 4:
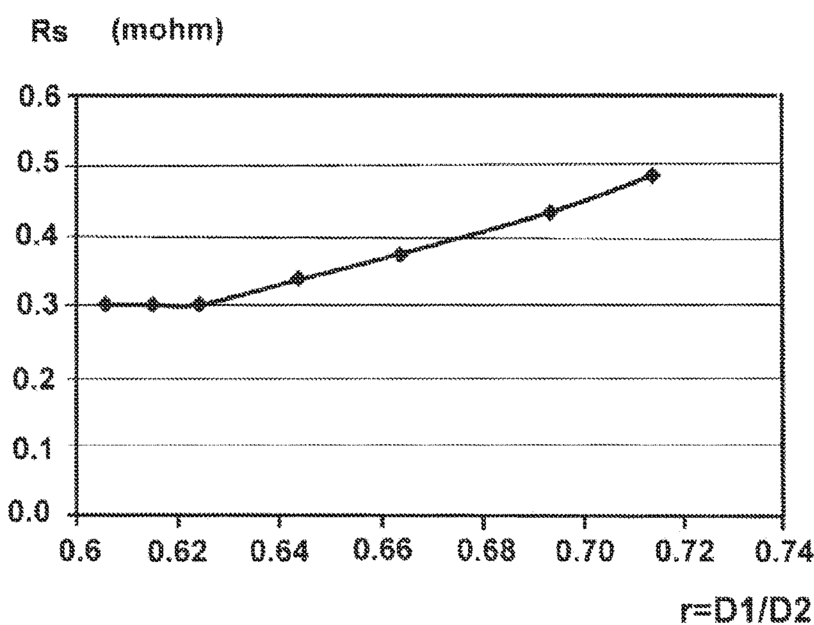
FIG. 4 shows the variation of the stator resistance of a synchronous electric motor of a type corresponding to the main embodiment of the invention, according to the dimensional ratio of rotor to stator.

This is explained by the fact that:

- the increase in the first outer diameter D1 of the rotor 1 leads to an increase in the flux produced by the rotor 1 (which leads to an increase in the Ke of the motor 1, 11, as shown in FIG. 3), and then to reduction of the stator current necessary in order to produce the torque;
- when the first outer diameter D1 of the rotor 1 is increased, whilst maintaining a constant number of revolutions so as not to increase the inductance of the stator windings 14 (account is taken only of the effect of the increase in the first outer diameter D1 of the rotor 1 on the inductance of the motor 1, 11) the cross-section of the wire must be decreased because the surface area of the notches 12 becomes smaller (a constant filling level of the notches 12 is maintained); in this case, the stator resistance Rs increases as shown in FIG. 4.

The best compromise has been found between the reduction of the stator current (by means of the increase in the first outer diameter D1 of the rotor 1) and the increase in the stator resistance Rs (caused by the reduction of the cross-section of the wire), in order to obtain minimum stator losses by Joule effect $P_J$ and consequently improvement of the performance of the motor 1, 11 (FIG. 2).

In fact, if the first outer diameter D1 of the rotor 1 is increased, it is necessary to increase the width both of the stator teeth 13 and the casing 3, i.e. a second outer diameter D2 of the stator 11, such as to increase the total magnetic flux produced by the motor 1, 11, and in this case the surface area of the notches 12 is decreased. As a result, the cross-section of the wire is reduced because the number of turns must not change.

By calculating the filling level during simulations, discontinuity was noticed caused by the non-linearity of the dimensions of the wire (for example there is no wire with a dimension of between 0.53 mm and 0.56 mm).

It will be appreciated that the invention is not limited simply to the above-described preferred embodiments.

Other embodiments with general characteristics different from those specified above, in particular with a different number of poles, and corresponding to other tests or simulations of motors comprising a rotor 1 and a stator 11 of the type described, would not be outside the scope of the present invention, provided that they are derived from the following claims.

The invention claimed is:

1. A synchronous electric motor with permanent magnets (1, 11), the synchronous electric motor comprising:

- a wound stator (11) comprising a casing, and stator teeth (13) extending axially and formed in said casing (10), and
- a rotor (1) comprising a head, and a plurality of said permanent magnets (3) extending axially in first recesses (4) in said head (2),
- each of said permanent magnets (3) comprising a first parallelepiped portion close to a circumferential portion (5) of said rotor (1) and adjacent to a second wedge portion in the form of a wedge, close to a central portion (6) of said rotor (1);

a dimensional ratio (r) of a first outer diameter (D1) of said rotor (1) to a second outer diameter (D2) of said stator (11) is between 0.63 and 0.7.

2. The synchronous electric motor with permanent magnets (1, 11) according to claim 1, wherein said dimensional ratio (r) is predetermined such that stator losses by Joule effect (PJ) are minimum.

3. The synchronous electric motor with permanent magnets (1, 11) according to claim 2, wherein said rotor (1) is of the flux concentration type.

4. The synchronous electric motor with permanent magnets (1, 11) according to claim 3, wherein said permanent magnets (3) comprise ferrite.

5. Equipment of a motor vehicle, comprising a synchronous electric motor with permanent magnets (1, 11) according to claim 3.

6. The synchronous electric motor with permanent magnets (1, 11) according to claim 2, wherein said permanent magnets (3) comprise by ferrite.

7. Equipment of a motor vehicle, comprising a synchronous electric motor with permanent magnets (1, 11) according to claim 2.

8. The synchronous electric motor with permanent magnets (1, 11) according to claim 1, wherein said rotor (1) comprises at least one plurality of second recesses (9) which extend axially, and are arranged between said permanent magnets (3) in an intermediate part of said rotor (1) between said central part (6) and said circumferential part (5).

9. The synchronous electric motor with permanent magnets (1, 11) according to claim 8, wherein tie rods are arranged in said second recesses (9).

10. The synchronous electric motor with permanent magnets (1, 11) according to claim 9, wherein said permanent magnets (3) comprise ferrite.

11. Equipment of a motor vehicle, comprising a synchronous electric motor with permanent magnets (1, 11) according to claim 9.

12. The synchronous electric motor with permanent magnets (1, 11) according to claim 8, wherein said permanent magnets (3) comprise ferrite.

13. Equipment of a motor vehicle, comprising a synchronous electric motor with permanent magnets (1, 11) according to claim 8.

14. The synchronous electric motor with permanent magnets (1, 11) according to claim 1, wherein said permanent magnets (3) comprise ferrite.

15. Equipment of a motor vehicle, comprising a synchronous electric motor with permanent magnets (1, 11) according to claim 14.

16. Equipment of a motor vehicle, comprising a synchronous electric motor with permanent magnets (1, 11) according to claim 1.

17. An electric compressor which is designed to equip a motor vehicle, wherein it comprises a synchronous electric motor with permanent magnets (1, 11) according to claim 1.

18. The synchronous electric motor with permanent magnets (1, 11) according to claim 1, wherein said permanent magnets (3) comprise ferrite.

* * * * *